US011586516B2

(12) United States Patent
Hironaka et al.

(10) Patent No.: US 11,586,516 B2
(45) Date of Patent: Feb. 21, 2023

(54) STORAGE SYSTEM, STORAGE DEVICE, AND STORAGE DEVICE MANAGEMENT METHOD

(71) Applicant: Hitachi, Ltd., Tokyo (JP)

(72) Inventors: Kazuei Hironaka, Tokyo (JP); Akira Deguchi, Tokyo (JP); Tsukasa Shibayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/472,416

(22) Filed: Sep. 10, 2021

(65) Prior Publication Data

US 2022/0261323 A1 Aug. 18, 2022

(30) Foreign Application Priority Data

Feb. 15, 2021 (JP) .............................. JP2021-021588

(51) Int. Cl.
*G06F 11/20* (2006.01)

(52) U.S. Cl.
CPC ...... *G06F 11/2094* (2013.01); *G06F 2201/85* (2013.01)

(58) Field of Classification Search
CPC .................................................. G06F 11/2094
USPC ........................................................ 714/6.3
See application file for complete search history.

(56) References Cited

U.S. PATENT DOCUMENTS

| 2009/0271582 | A1 | 10/2009 | Ninose | |
|---|---|---|---|---|
| 2017/0235590 | A1* | 8/2017 | Sinha | ................... G06F 11/2069 |
| | | | | 718/1 |
| 2019/0138620 | A1* | 5/2019 | Avery | .................. G06F 16/1844 |
| 2021/0097032 | A1* | 4/2021 | Sahin | ..................... G06F 16/173 |
| 2021/0216412 | A1* | 7/2021 | Navon | ................ G06F 11/1451 |
| 2022/0100379 | A1* | 3/2022 | O'Halloran | ............. G06F 3/067 |

FOREIGN PATENT DOCUMENTS

WO 2015/189925 A1 12/2015

* cited by examiner

*Primary Examiner* — Chae M Ko
(74) *Attorney, Agent, or Firm* — Procopio, Cory, Hargreaves & Savitch LLP

(57) ABSTRACT

An object of the present invention is to realize a proper storage operation in accordance with the state of a storage devices which constructed remote copy pair via a network. A first storage device for providing a first volume and a second storage device for providing a second volume as a remote copy destination of the first volume, includes: a storing unit for policy sets that is a regulation group relating to the service quality of the second volume; and a policy selection unit for selecting a policy set to be used from the plurality of policy sets in accordance with the states of the first volume and the second storage device. According to such a configuration and operation, it is possible to properly operate the storage device by selecting a policy set before and after the failover or according to the presence or absence of degeneration.

8 Claims, 10 Drawing Sheets

FIG.4

LDEV MANAGEMENT TABLE
301

| LDEV NUMBER | LDEV CAPACITY | VOL TYPE | DATA REDUCTION VALIDITY | POOL NUMBER | PG NUMBER |
|---|---|---|---|---|---|
| 1 | 1 TB | EVOL | INVALID | 1 | N/A |
| 2 | 2 TB | TPVOL | VALID | 1 | N/A |
| 3 | 320 GB | SVOL | INVALID | 1 | N/A |
| 4 | 320 GB | PVOL | INVALID | 1 | N/A |
| 5 | 32 TB | RVOL | INVALID | N/A | 2 |
| ... | ... | ... | ... | ... | ... |

HA PAIR MANAGEMENT TABLE
300

| PAIR NUMBER 500 | AVAILABILITY 501 | PVOLLDEV NUMBER 502 | PAIR DEVICE ID 503 | SVOLLDEV NUMBER 504 | SYNCHRONIZATION SYSTEM 505 | PAIR STATE 506 | VIRTUAL ID 507 |
|---|---|---|---|---|---|---|---|
| 1 | POSSIBLE | 1 | 10001 | 1 | SYNC | PAIR | 001 |
| 2 | POSSIBLE | 2 | 10000 | 2 | ASYNC | PSUS | 002 |
| 3 | IMPOSSIBLE | 3 | — | — | — | — | — |
| ... | ... | ... | ... | ... | ... | ... | ... |

FIG.6

QoS POLICY MANAGEMENT TABLE
302

| POLICY NUMBER 600 | LDEV NUMBER 400 | IO TYPE 601 | MAXIMUM IOPS 602 | MINIMUM IOPS 603 | MAXIMUM BANDWIDTH 604 | MINIMUM BANDWIDTH 605 |
|---|---|---|---|---|---|---|
| 1 | 1 | W | — | — | 200 MB/s | 50 MB/s |
| 2 | 1 | W | — | — | 100 MB/s | 50MB/s |
| 3 | 2 | R | 5000 | 2500 | — | — |
| 4 | 2 | R | 10000 | 5000 | — | — |
| 5 | 3 | R | 10000 | 5000 | — | — |
| 6 | 3 | R | 5000 | 2500 | — | — |
| ... | ... | | ... | ... | ... | ... |

FIG.7

QoS POLICY Gr MANAGEMENT TABLE
303

| POLICY Gr. NUMBER | APPLICATION CONDITION | DETAILED CONDITION | APPLICATION POLICY |
|---|---|---|---|
| 1 | HA PRIMARY | CTR NORMAL | [1,3,5] |
| 2 | HA PRIMARY | CTR DEGENERATION | [2,4,6] |
| 3 | HA SECONDARY | CTR NORMAL | ... |
| 4 | HA SECONDARY | CTR DEGENERATION | ... |
| ... | ... | ... | ... |

FIG.8

LDEV OPERATION INFORMATION TABLE
304

| LDEV NUMBER 400 | READ IOPS 800 | WRITE IOPS 801 | READ BANDWIDTH 802 | WRITE BANDWIDTH 803 |
|---|---|---|---|---|
| 1 | 10 | 200 | 172 MB/s | 5 MB/s |
| 2 | 1000 | 10 | 10 MB/s | 183 MB/s |
| 3 | 10 | 5 | 3 MB/s | 1 MB/s |
| ... | ... | ... | ... | ... |

| TIME STAMP 804 |
|---|
| 2020.10.01 00:00:00 |
| 2020.10.01 00:00:30 |
| 2020.10.01 00:01:30 |
| ... |

STORAGE SYSTEM, STORAGE DEVICE, AND STORAGE DEVICE MANAGEMENT METHOD

BACKGROUND

The present invention relates to a storage system, a storage device, and a storage device management method.

In a storage system used in a company, in general, one or more devices are redundantly configured and operated by improving system availability and reliability.

U.S. Patent Application No. 2009/0271582 discloses a storage system capable of improving availability. According to U.S. Patent Application No. 2009/0271582, a first volume of a first storage device and a second volume of a second storage are provided to a host as the same volume. As a result, the host can recognize the first volume and the second volume as the same volume connected via different paths.

International Publication No. 2015/189925 discloses a high availability (HA) pair configuration in which a first volume of a first storage device and a second volume of a second storage device respond to a host computer with the same virtual ID.

According to International Publication No. 2015/189925, when the first storage device or the second storage device receives a data copy instruction designating a virtual ID as a copy destination from a host, either the first volume or the second volume is selected as a copy source volume according to the storage device in which the copy destination volume exists, and data is copied from the copy source volume to the copy destination volume.

In addition, in the storage system, a Quality of Service (QoS) function that realizes service level assurance (SLA) such as a constant bandwidth and performance by preferentially processing the access from a specific host or volume connected to the storage device rather than the access to other hosts or volumes is widely implemented.

SUMMARY

By configuring an HA pair between the first volume (hereinafter, referred to as Primary Volume (PVOL)) of the first storage device and the second volume (hereinafter, referred to as Secondary Volume (SVOL)) of the second storage device, for example, even in the case where a failure occurs in the first storage device and access to the PVOL becomes impossible, the access destination volume is automatically switched (failover) from the PVOL to the SVOL, so that the host can continue the operation.

However, the operation cost becomes high when providing the second storage device having the same configuration as that of the first storage device for the purpose of only failover.

Therefore, in order to more efficiently utilize the second storage device in companies, the second storage device is utilized as a failover destination in the HA pair. Other than this case, in order to perform an efficient operation, the second storage device is utilized for a secondary purpose that is preferable to be performed without affecting the first storage device or the host using the PVOL, such as use of the second storage device as a data backup source of the first volume, batch processing for the purpose of referring to data, and development and tests.

In such an operation, for example, when considering to set the QoS for the purpose of SLA for guaranteeing IO performance and a bandwidth for the PVOL, it is assumed that the QoS setting applied to the PVOL should be similarly applied to the SVOL in consideration of an operation after failover by which the operation of the host is continued by failing over to the second storage device even when a failure occurs in the first storage device as described above.

However, the QoS setting is designed on the basis of the device performance and the usage state of the first storage device, and even if the device configurations of the first storage device and the second storage device are the same, it is considered that the usage state and the load state are different. Therefore, even if the QoS setting is similarly applied in the second storage device, the QoS setting does not always satisfy the intended SLA in the second storage device after the failover.

Therefore, in the case of failing over from the first storage device to the second storage device, it is required to set the QoS in the second storage device so as to satisfy the SLA realized in the first storage device. In addition, not only the case of failover, but also in the case where the state of the storage device changes due to occurrence of degeneration in which a failure partially occurs in the storage device, it is desirable to use an appropriate QoS setting in accordance with such a change. The same applies to a case in which the processing amount of the storage device differs depending on time, the day of the week, or the like.

Accordingly, the present invention of the application discloses a technique for realizing a proper operation in accordance with the state of the storage device.

One of representative storage systems of the present invention is a storage system having a first storage device for providing a first volume to a host connected via a network and a second storage device for providing a plurality of volumes including a second volume as a remote copy destination of the first volume, and the system includes: a storing unit for storing a plurality of policy sets that is a regulation group relating to the service quality of the second volume and the plurality of other volumes of the second storage device; and a policy selection unit for selecting a policy set to be used from the plurality of policy sets in accordance with the states of the first volume and the second storage device.

In addition, one of representative storage devices of the present invention is a storage device for providing a volume to a host connected via a network, and the device includes: a storing unit for storing a plurality of policy sets that is a regulation group relating to the service quality of the volume; and a policy selection unit for selecting a policy set to be used from the plurality of policy sets in accordance with the state of the own device.

In addition, one of representative storage device management methods of the present invention is a storage device management method for managing a first storage device for providing a first volume to a host connected via a network and a second storage device for providing a plurality of volumes including a second volume as a remote copy destination of the first volume, and the method includes: a step of storing into a storing unit a plurality of policy sets that is a regulation group relating to the service quality of the second volume and the plurality of other volumes of the second storage device; a step of determining the states of the first volume and the second storage device; and a step of selecting a policy set to be used from the plurality of policy sets in accordance with the states of the first volume and the second storage device.

According to the present invention, it is possible to realize a proper operation in accordance with the state of a storage device. Problems, configurations, and effects other than those described above will become apparent from the description of the following embodiment.

BRIEF DESCRIPTION OF THE DRAWINGS

FIG. 4 shows a configuration example of an LDEV management table in the management information of the storage device of the embodiment of the present application;

FIG. 5 shows a configuration example of an HA pair management table in the management information of the storage device of the embodiment of the present application;

FIG. 6 shows a configuration example of a QoS policy management table in the management information of the storage device of the embodiment of the present application;

FIG. 7 shows a configuration example of a QoS policy Gr management table in the management information of the storage device of the embodiment of the present application;

FIG. 8 shows a configuration example of an LDEV operation information table in the management information of the storage device of the embodiment of the present application;

DETAILED DESCRIPTION

Figure 1:
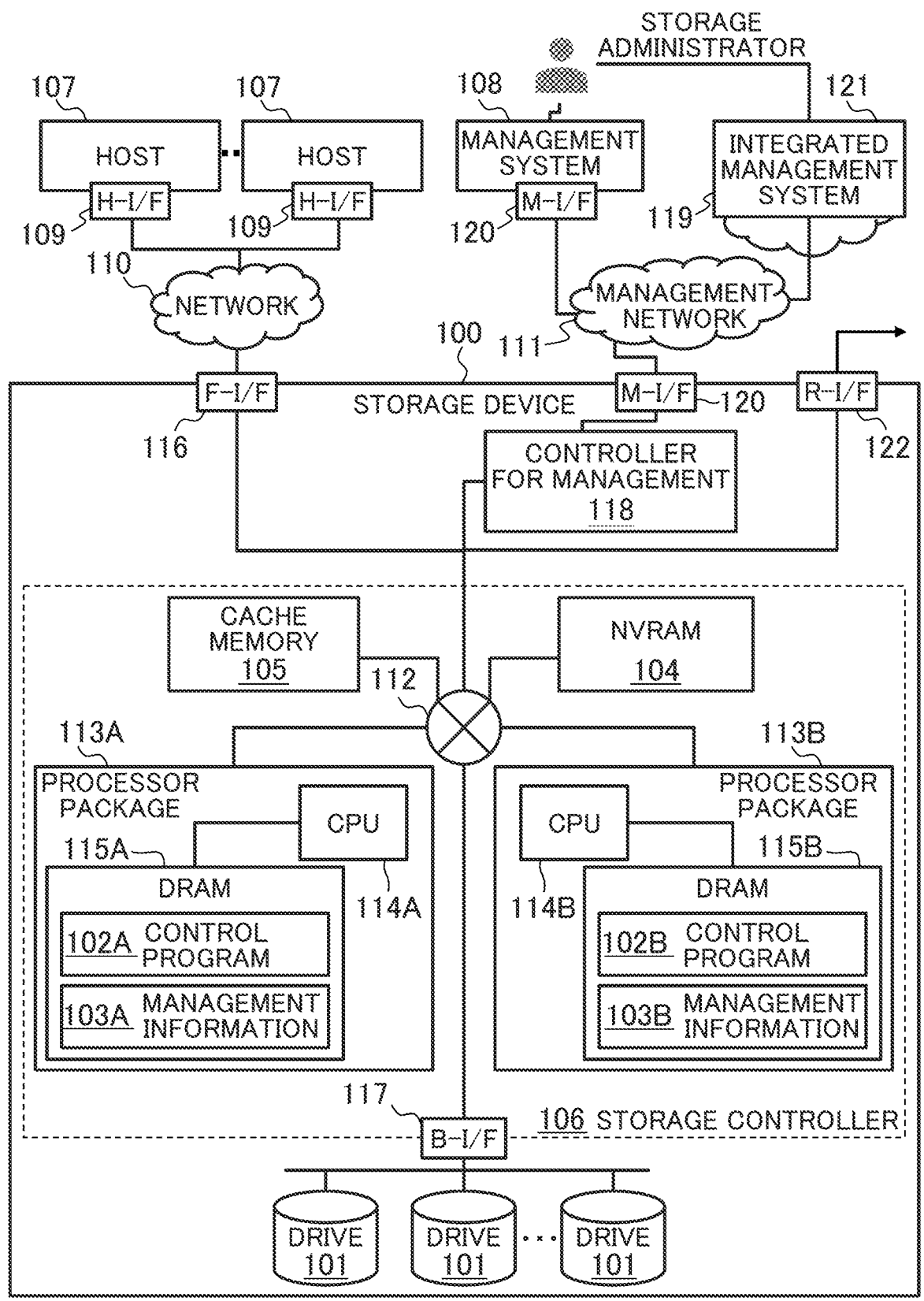
FIG. 1 shows a configuration example of a storage device according to an embodiment.

An embodiment of the present invention will be described with reference to the drawings.

It should be noted that the embodiment to be described below is not intended to limit the invention according to the claims, and all combinations of elements described in the embodiment are not necessarily essential to the solving means of the invention. In addition, in the following description, various types of information may be described by expressions such as "* table", "* list", "* DB", and "* queue", but various types of information may be expressed by data structures other than tables, lists, DBs, queues, and the like. Therefore, "* table", "* list", "* DB", "* queue", and the like may be referred to as "*** information" in order to indicate that they do not depend on the data structure.

Further, in the following description, expressions such as "identification information", "identifier", "name", and "ID" are used when describing the contents of each information, but these can be replaced with each other.

In addition, in the following description, the embodiment of the present invention to be described later may be implemented by software running on a general-purpose computer, or may be implemented by dedicated hardware or a combination of software and hardware.

In addition, in the following description, processing will be described using "program" as the subject, but since the program is executed by a processor (for example, CPU: Central Processing Unit) to execute defined processing using a storage resource (for example, a memory), a communication I/F, and a port, the description may be made using the processor as the subject.

In addition, in the following description, the processing described using the program as the subject may be performed by a computer (for example, a computing host or a storage device) having a processor. In addition, in the following description, an expression "controller" may be used to indicate a processor or a hardware circuit that performs some or all of the processing performed by the processor. The program may be installed in each computer from a program source (for example, a program distribution server or a computer readable storage medium). In this case, the program distribution server includes a CPU and a storage resource, and the storage resource further stores a distribution program and a program to be distributed. Then, when the CPU executes the distribution program, the CPU of the program distribution server distributes the program to be distributed to other computers.

In addition, in the following description, "PDEV" means a physical storage device, and may be typically a non-volatile storage device (for example, an auxiliary storage device). The PDEV may be, for example, an HDD (Hard Disk Drive) or an SSD (Solid State Drive). Different types of PDEVs may be mixed in the storage system.

In addition, in the following description, "RAID" is an abbreviation of Redundant Array of Inexpensive Disks. A RAID group is configured using a plurality of PDEVs (typically, similar types of PDEVs), and stores data in accordance with a RAID level associated with the RAID group. The RAID group may be referred to as a parity group (PG). The parity group may be, for example, a RAID group storing parity.

In addition, in the following description, "VOL" is an abbreviation of a volume, and may be a physical storage device or a logical storage device. The VOL may be a substantial VOL (RVOL) or a virtual VOL (VVOL). The "RVOL" may be a VOL based on physical storage resources (for example, one or more RAID groups) provided in the storage system having the RVOL. The "VVOL" may be any of an externally connected VOL (EVOL), a capacity expansion VOL (TPVOL), and a snapshot VOL. The EVOL is based on a storage space (for example, VOL) of an external storage system, and may be a VOL that conforms to storage virtualization technology. The TPVOL is configured using a plurality of virtual areas (virtual storage areas), and may be a VOL that conforms to capacity virtualization technology (typically, Thin Provisioning).

In addition, in the following description, "POOL" is a logical storage area (for example, a set of a plurality of pool VOLs), and may be prepared for each purpose. For example, the pool may be at least one kind of TP pool or snapshot pool. The TP pool may be a storage area configured using a plurality of pages (substantial storage areas). In the case where a page has not been assigned to a virtual area (virtual area of the TPVOL) to which an address designated by a write request received from a host system (hereinafter, referred to as a host) belongs, a storage controller assigns a page from the TP pool to the virtual area (write-destination virtual area) (even when a page has been already assigned to the write-destination virtual area, a new page may be assigned to the write-destination virtual area). The storage controller may write the write target data associated with the write request to the assigned page. The snapshot pool may be a storage area in which data saved from the original VOL is stored. One pool may be used as the TP pool or the snapshot pool. "Pool VOL" may be a VOL serving as a constitutional element of the pool. The pool VOL may be an RVOL or an EVOL.

In addition, in the following description, the VOL (VOL provided to the host) recognized by the host is referred to as "LDEV". In the following description, the LDEV is a TPVOL (or RVOL), and the pool is a TP pool. However, the present invention can be also applied to a storage device which does not employ capacity expansion technology (Thin Provisioning).

In addition, in the following description, "PVOL (Primary VOL)" may be an LDEV serving as a source volume of backup, replication, or snapshot, and "SVOL (Secondary VOL)" may be an LDEV serving as a destination of backup, replication, or snapshot.

Hereinafter, the embodiment will be described in detail.

FIG. 1 shows a configuration example of a storage device according to the embodiment.

One or more hosts 107 are connected to a storage device 100 via a network 110. In addition, a management system 108 is connected to the storage device 100. The network 110 is, for example, an FC (Fibre Channel) or an iSCSI (Internet Small Computer System Interface).

The host 107 is an abbreviation of a host system and is one or more hosts. The host 107 has an H-I/F host interface 109, and transmits an access request (a write request or a read request) to the storage device 100 and receives a response (for example, a write response including write completion or a read response including a read target chunk) of the access request via the host interface 109. The host interface 109 is, for example, an HBA (Host Bus Adapter) or an NIC (Network Interface Card).

The storage device 100 has a plurality of drives 101 and a storage controller 106 connected to the plurality of drives 101. One or more RAID groups including the plurality of drives 101 may be configured.

The management system 108 manages the configuration and state of the storage device 100. The management system 108 has an M-I/F management interface device 120, and transmits a command to the storage device 100 or receives a response of the command via a management network 111 to which the management interface device 120 is connected. The management interface device 120 is, for example, an NIC.

In addition, the management system 108 may be software executed on a server or a PC for managing the storage device 100, or may be implemented as a function of a security appliance or software for managing the host 107 connected to the storage device 100.

An integrated management system 121 is, for example, management software executed on a cloud 119 for managing and monitoring the configurations and operation states of a plurality of storage devices 100 at a plurality of locations. The integrated management system 121 communicates with the storage device 100 to be managed via the management network 111 to collect configuration information and operation information of each storage device 100.

A controller for management 118 is a controller for providing a function for managing the storage device 100, and receives a command from the management system 108 and the integrated management system 121, returns a response to the command, transmits the configuration information and the operation information of the storage device 100 to the management system 108 and the integrated management system 121, and changes the setting and configuration of the storage device 100. The controller for management 118 is, for example, a Baseboard Micro Controller (BMC).

The storage controller 106 has an F-I/F front-end interface 116, a B-I/F back-end interface 117, an R-I/F replication interface 122, a CM cache memory 105, an NVRAM (Non-Volatile RAM) 104, a processor package 113A, a processor package 113B, and a repeater 112 for relaying communications between these elements. The repeater 112 is, for example, a bus or a switch.

The front-end interface 116 is an interface for communicating with the host 107 connected to the storage device 100, and is, for example, an interface of an FC (Fibre Channel) or an iSCSI (Internet Small Computer System Interface).

The back-end interface 117 is an interface for communicating with the drives 101. The back-end interface 117 may include an E/D circuit (hardware circuit for encryption and decryption). Specifically, for example, the B-I/F back-end interface 117 may include an SAS (Serial Attached SCSI (Small Computer System Interface)) controller, and the SAS controller may include the E/D circuit.

The replication interface 122 is an interface used when configuring an HA configuration among the plurality of storage devices 100, and is connected to other storage devices 100 configuring the HA via the network 110. The replication interface 122 is, for example, an FC or an iSCSI.

In the CM cache memory 105 (for example, a DRAM (Dynamic Random Access Memory)), data to be written into the drive 101 or data read from the drive 101 is temporarily stored by the processor package 113. In the NVRAM 104, data (for example, dirty data (data not written into the drive 101)) in the cache memory 105 is saved by the processor package 113 having received power from a battery (not shown) at the time of power interruption.

In the storage controller 106, a cluster is configured using the processor package 113A and the processor package 113B. The processor package 113A (processor package 113B) has a DRAM 115A (DRAM 115B) and a CPU 114A (CPU 114B). The DRAM 115A (DRAM 115B) stores a control program 102A (control program 102B) executed by the CPU 114A (CPU 114B) and management information 103A (management information 103B) to be referred to or updated by the CPU 114A (CPU 114B). The CPU 114A (CPU 114B) executes the control program 102A (control program 102B) so that, for example, I/O processing and address conversion processing of the storage device 100 are executed. At least one of the control program 102A (control program 102B) and the management information 103 (management information 103B) may be stored in a storage area (for example, CM 105) shared by a plurality of processor packages 113A and processor packages 113B.

<Example of Failover in HA Pair Configuration>

Figure 2:
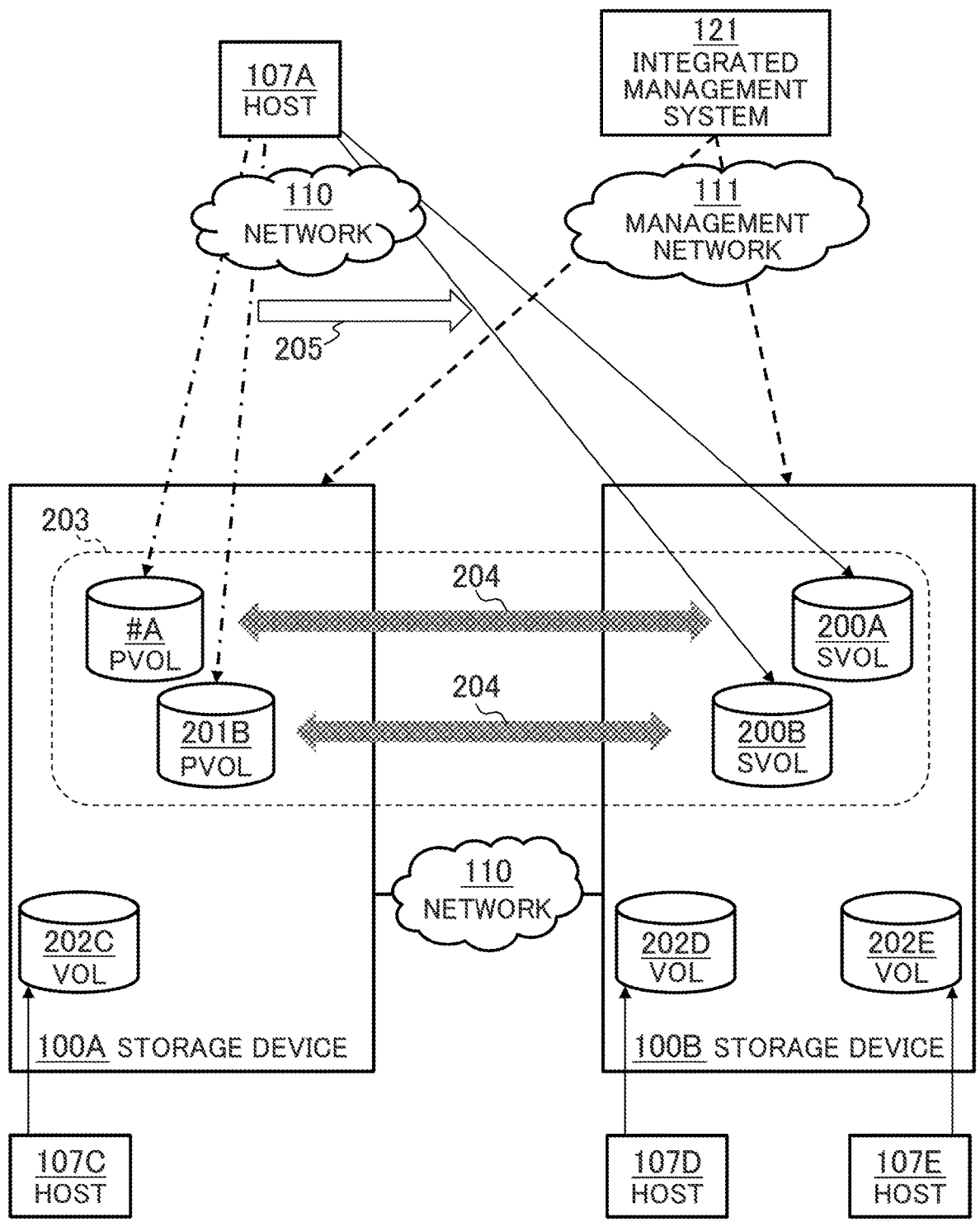
FIG. 2 shows a configuration example of failover in an HA pair configuration according to the embodiment.

FIG. 2 shows a configuration example of failover in an HA pair configuration according to the embodiment.

Here, an example in which failover is performed in the HA pair configuration configured among the plurality of storage devices 100 will be shown, and problems to be solved by the technique of the present application will be described by using concrete examples.

In FIG. 2, an HA pair configuration is configured between a storage device 100A and a storage device 100B, and a PVOL 201A and a PVOL 201B of the storage device 100A are associated as pairs with the an SVOL 200A and an SVOL 200B of the storage device 100B of the pair device, respectively.

In addition, the contents between the SVOL 200A associated with the PVOL 201A and the SVOL 200B associated with the PVOL 201B are synchronized via the network 110 or by remote copies 204. The synchronization system in this case may be a system of synchronizing with data update to the PVOL 201A and the PVOL 201B, or a system of asynchronously reflecting update differential data to the PVOL 201A and the PVOL 201B on the SVOL 200A and the SVOL 200B.

Here, as a general configuration example, the storage device 100A and the storage device 100B may be at locations having a physical distance therebetween in consideration of the availability of the system, or may be installed at a close distance, for example, on the same floor in the same data center.

In addition, a host 107A and a host 107C in the storage device 100A and the host 107A, a host 107D, and a host 107E in the storage device 100B form paths with the corresponding VOLs to be connected and operated.

In addition, the integrated management system 121 periodically monitors configuration information and performance information of the storage device 100A and the storage device 100B via the management network 111, and a storage administrator can monitor the state of each storage device via the integrated management system 121 and can change the configuration and setting of each storage device by an instruction to the integrated management system 121.

In addition, the host 107A executes an important application for which availability is required, and accessible paths are defined among the PVOL 201A and the PVOL 201B of the storage device 100A and the SVOL 200A and the SVOL 200B of the storage device 100B forming the pair via the network 110 in order to ensure the availability of the operation.

The host 107A is normally operated by accessing the PVOL 201A and the PVOL 201B, but in the case where, for example, it is impossible to access the PVOL 201A and the PVOL 201B due to a failure or the like of the storage device 100A, the access destinations are switched to the SVOL 200A and the SVOL 200B of the storage device 100B by failover 205 to continue the operation, thereby performing the operation in which the availability is ensured.

Here, the failover 205 may be executed by the host 107A by detecting a failure by the storage devices 100 configuring the HA pair and notifying the host 107A from the storage device 100A, or the failover 205 may be executed due to the convenience of the host 107A.

In the configuration as described above, for example, for the host 107A that executes an important application for which availability is required, it is conceivable that a certain service level such as an I/O bandwidth or IO Per Second (IOPS) for the access should be guaranteed from the viewpoint of performance stability. Therefore, by setting a QoS for the PVOL 201A and the PVOL 201B, it is possible to prevent the access of the host 107A from being inhibited by the access to a VOL 202C sharing the devices and to keep the service level constant.

In addition, the host 107A may switch the access destinations to the SVOL 200A and SVOL 200B as the HA pairs by executing the failover 205, and in this case, it is conceivable that the same service level as the PVOL 201A and the PVOL 201B should be guaranteed in the SVOL 200A and the SVOL 200B.

However, as described above, since the storage device 100A and the storage device 100B are different from each other in the connected host, the defined number of VOLs, and the load status (workload) on the device, even if the QoS set to the PVOL 201A and the PVOL 201B is similarly set to the SVOL 200A and the SVOL 200B, the expected service level is not necessarily maintained.

In addition, since the HA pair configuration requires at least two primary and secondary storage devices 100, the operation cost is inevitably high. Therefore, in order to improve the operation cost and the operation efficiency by increasing the operation rate of the storage devices 100, it is conceivable that the secondary device (for example, the storage device 100B) in the normal state is operated so as to be utilized for a different secondary purpose until the failover 205 is actually executed.

Accordingly, according to the present invention, by setting a plurality of types of QoS policies in advance in accordance with the status of failover, the access to the VOL 202D, the VOL 202E, and the like used for a secondary purpose by the host 107D and the host 107E is given priority until the failover 205 is actually executed in the secondary device (for example, the storage device 100B) in the HA pair configuration. On the other hand, in the case where the failover 205 is executed and the access of the host 107A is switched to the storage device 100B side, the QoS is controlled in such a manner that the QoS policy is switched and applied, and the access to the SVOL 200A and the SVOL 200B is given priority so that, for example, the service level expected by the host 107A can be maintained even after the failover 205 is executed.

In addition, in the case where the integrated management system 121 determines that it is difficult to maintain the service level after the failover 205 is executed on the basis of a prediction using the operation information such as the configuration and performance information of each storage device for a plurality of kinds of preset QoS policies, a warning of a risk is given or a realizable QoS policy is proposed to the storage administrator to control the system so as not to cause inconsistency of the QoS policy or service level deterioration even after the failover 205 is executed.

It should be noted that the determination of which QoS policy is to be applied to each storage device 100 may be made by the storage device 100 itself, or may be made by the integrated management system 121 to give an order of changing the QoS setting to each storage device 100.

As described above, an appropriate QoS can be set in consideration of the state before and after the failover 205 in the HA pair configuration, so that the operation efficiency in the secondary device can be enhanced until the failover 205 actually occurs while maintaining the service level and availability necessary for the stable operation of the system, and the efficiency of the system operation can be improved.

Hereinafter, the embodiment will be described in detail.

Figure 3:
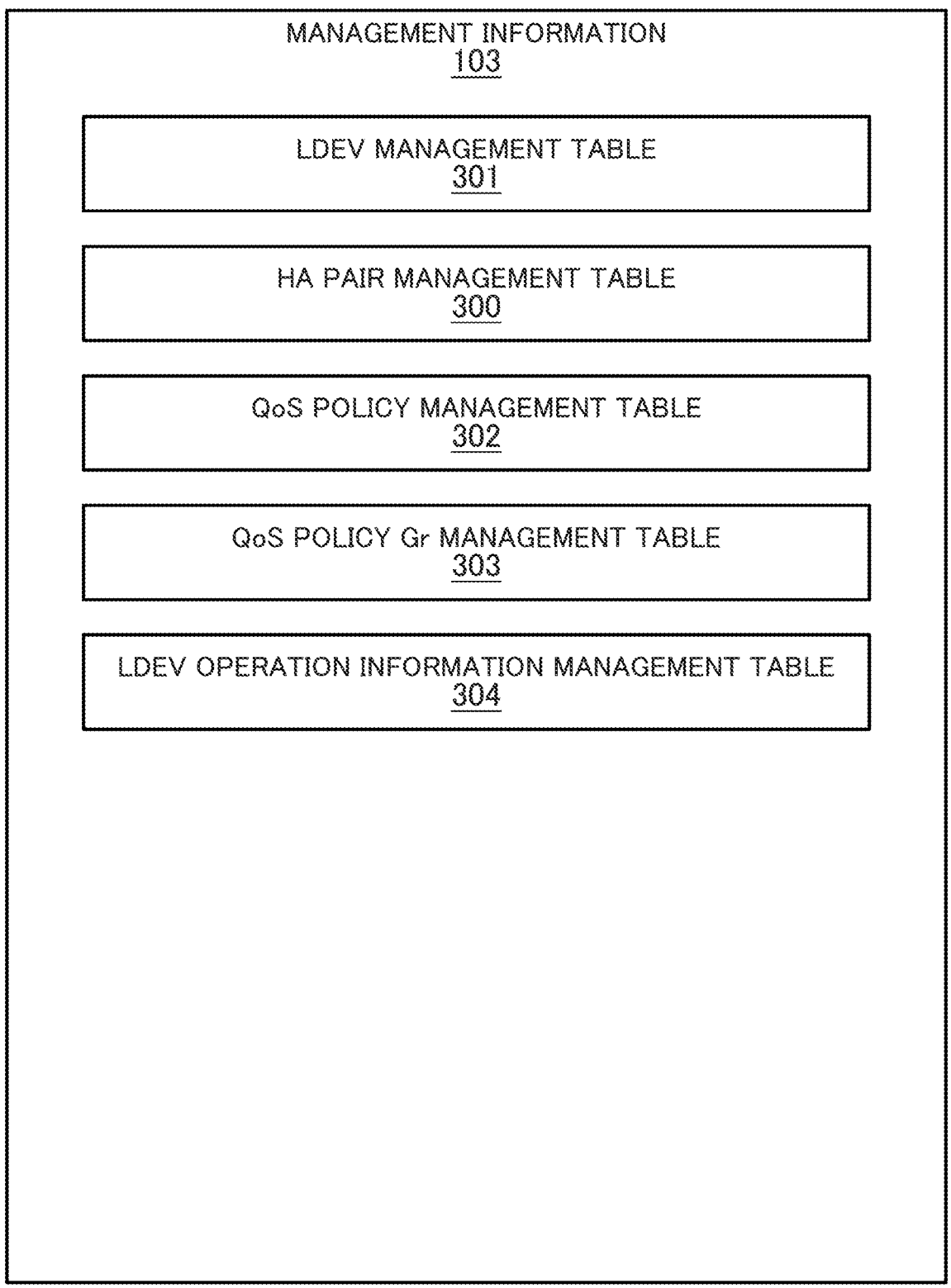
FIG. 3 shows a configuration example of management information in the storage device of the embodiment of the present application.

FIG. 3 shows a configuration example of management information in the storage device of the embodiment of the present application.

The management information 103 includes a plurality of management tables. The management tables are configured using, for example, an LDEV management table 301 for holding information about LDEVs, an HA pair management table 300 for holding information for managing HA pair configurations, a QoS policy management table 302 for holding information for managing QoS policies, a QoS policy Gr management table 303 for holding information for managing a plurality of QoS policies as a group, an LDEV operation information table 304 for managing operation information for each LDEV, and the like, and at least a part of information may be synchronized between the management information 103A and the management information 103B or between the storage device 100A and the storage device 100B.

FIG. 4 shows a configuration example of the LDEV management table in the management information of the storage device of the embodiment of the present application.

The LDEV management table 301 has an entry (record) for each LDEV such as "PVOL" or "SVOL". The information stored in each entry is an LDEV number 400, an LDEV capacity 401, a VOL type 402, data reduction validity 404, a pool number 403, a PG number 405, and {data migration target}.

The LDEV number 400 represents the identification number of the LDEV.

The LDEV capacity 401 represents the capacity of the LDEV.

The VOL type 402 represents the type of the LDEV, and represents, for example, "RVOL", "TPVOL", the SVOL of snapshot, or the like.

The data reduction validity 404 represents an attribute of whether a data reduction function such as data compression or deduplication is valid in the LDEV.

The pool number 403 represents the identification number of a pool with which each LDEV is associated in the LDEVs having logical capacities such as "EVOL", "TPVOL", and "SVOL", and a data storage area is allocated from an area in the pool with which the pool number 403 is associated. On the other hand, an LDEV having a physical capacity such as "RVOL" is not associated with a pool, and thus "N/A" is set.

The PG number 405 represents the identification number of an associated parity group (PG) in the LDEVs having physical capacities such as "RVOL". On the other hand, there is no directly-associated PG in the LDEVs having logical capacities such as "EVOL", "TPVOL", and "SVOL", and thus "N/A" is set.

FIG. 5 shows a configuration example of the HA pair management table in the management information of the storage device of the embodiment of the present application.

The HA pair management table 300 has an entry for each HA pair. The information stored in each entry includes a pair number 500, {availability}, a PVOLLDEV number 502, a pair device ID 503, an SVOLLDEV number 504, a synchronization system 505, a pair state 506, and a virtual ID 507.

The pair number 500 is the number of the HA pair managed by the storage device 100. The PVOLLDEV number 502 is the LDEV number 400 of the PVOL 201 configuring the pair. The pair device ID 503 is an ID for identifying the storage device 100 to which the SVOL 200 paired with the PVOLLDEV number 502 belongs. The SVOLLDEV number is the LDEV number 400 in the storage device to which the SVOL belongs. The synchronization system 505 is information for designating a timing for synchronizing the data of the PVOL 201 and the SVOL 200 configuring the pair, and designates an "SYNC" system for synchronizing the data of the PVOL 201 and the SVOL 200 configuring the pair with the data write to the PVOL 201 to synchronize the contents of the PVOL 201 and the SVOL 200, an "ASYNC" system for synchronizing the contents of the PVOL 201 and the SVOL 200 asynchronously with the data write to the PVOL, and the like. The pair state 506 represents the state of a pair configured using the PVOL 201 and the SVOL 200. For example, "PAIR" is set if a pair state in which data is synchronized is configured, and "PSUS" is set if a pair in which data is not synchronized is configured. The virtual ID 507 is the ID of a virtual LDEV that enables the same LDEV and the host 107 to recognize the PVOL 201 and the SVOL 200 configuring the pair.

FIG. 6 shows a configuration example of the QoS policy management table in the management information of the storage device of the embodiment of the present application.

The QoS policy management table 302 has an entry for each QoS policy. The information stored in each entry includes a policy number 600, an LDEV number 400, an IO type 601, a maximum IOPS 602, a minimum IOPS 603, a maximum bandwidth 604, and a minimum bandwidth 605.

The policy number 600 is the management number of the QoS policy. The LDEV number 400 represents the LDEV number 400 of the LDEV to be controlled by the QoS policy of the policy number 600. The IO type 601 is information for designating the type of IO controlled by the QoS policy of the policy number 600. For example, "R" is set if read access to the LDEV is a control target, and "W" is set if write access is a control target. The maximum IOPS 602 is information for designating the maximum IOPS allowed for the LDEV as the target of QoS. For example, if "5000" is set, the storage device 100 performs IO processing up to an upper limit of 5000 times per second. If the number of times of IO processing exceeds the limit, the information is used to control the IO processing of the LDEV not to exceed the designated load by not accepting the IO processing. The minimum IOPS 603 is information for designating the minimum IOPS allowed for the LDEV as the target of QoS. For example, if "2500" is set, the storage device 100 is controlled to perform IO processing at least 2500 times per second, so that I/O access to the LDEV is guaranteed. The maximum bandwidth 604 is information for designating the maximum IO bandwidth allowed for the LDEV as the target of QoS. For example, if "200 MB/s" is set, the storage device 100 performs processing up to an upper IO bandwidth limit of 200 MB/s. If the bandwidth exceeds the limit, the information is used to control the IO processing bandwidth of the LDEV not to exceed the designated load by not accepting the IO processing. The minimum bandwidth 605 is information for designating the minimum IO bandwidth allowed for the LDEV as the target of QoS. For example, if "50 MB/s" is set, the storage device 100 is controlled to perform processing at, at least, an IO bandwidth of 50 MB/s, so that I/O access to the LDEV is guaranteed.

FIG. 7 shows a configuration example of the QoS policy Gr management table in the management information of the storage device of the embodiment of the present application.

The QoS policy Gr management table 303 is a table for collectively managing QoS application policies as a group, and information stored in each entry stores information such as a policy Gr number 700, an application condition 701, a detailed condition 703, and an application policy 702.

The policy Gr number 700 is a group number for collectively managing a plurality of QoS policies as a group. The application condition 701 represents a condition for applying the QoS policy group, and for example, when defining a QoS policy to be applied in a normal state in the secondary device (storage device 100B) in a normal state in the HA pair, the field is "HA secondary", and the field is "HA primary" at the time of failover. In addition, the detailed condition 703 is a detailed condition in the application condition 701, and for example, if the application condition 701 is "HA primary" and the detailed condition 703 is "CTL normal", the HA pair state is primary in the device, and is used as a definition of the QoS policy to be applied in the normal state of the CTL. In addition, since the fields of the application condition 701 and the detailed condition 703 represent conditions to which the QoS policy of the entry should be applied, it is not necessary to limit the fields to the conditions of the HA pair, and various conditions may be defined according to various types of events, states, times, and the like occurring in, for example, the storage device 100. The application policy 702 represents a set of policy numbers 600 that are collectively applied by the QoS policy group.

FIG. 8 shows a configuration example of the LDEV operation information table in the management information of the storage device of the embodiment of the present application.

The LDEV operation information table 304 is associated with a table for storing operation information for each LDEV corresponding to each time indicated by a time stamp 804, and the operation information is stored as the value of each entry by the storage controller 106 for each LDEV for a constant period. The information stored in each entry stores information such as an LDEV number 400, a read IOPS 800, a write IOPS 801, a read bandwidth 802, and a write bandwidth 803.

The LDEV number 400 represents the LDEV number 400 of the target LDEV. The read IOPS 800 represents the number of times of read IO processing in the LDEV to be monitored per second. The write IOPS 801 represents the number of times of write IO processing in the LDEV to be monitored per second. The read bandwidth 802 represents a data bandwidth generated by read IO in the LDEV to be monitored per second. The write bandwidth 803 represents a data bandwidth generated by write IO in the LDEV to be monitored per second.

<QoS Policy Automatic Application Flow in Accordance with State of HA Pair>

Figure 9:
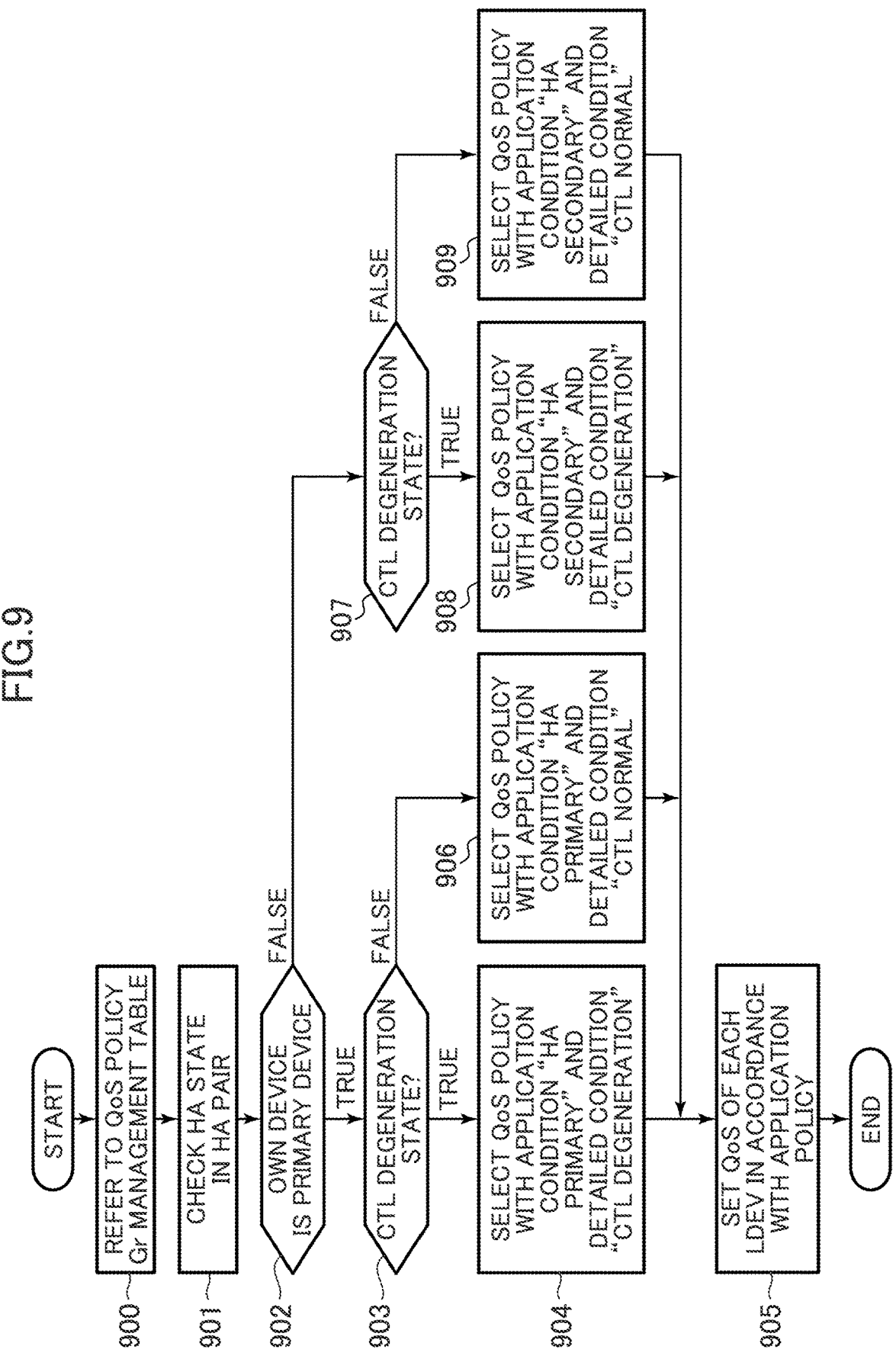
FIG. 9 shows a processing example of a QoS policy automatic application flow in accordance with the state of the HA pair in the storage device of the embodiment of the present application.

FIG. 9 shows a processing example of a QoS policy automatic application flow in accordance with the state of the HA pair in the storage device of the embodiment of the present application.

This processing flow is generally a processing flow for selecting and applying an appropriate QoS policy in accordance with the state of the HA pair in the storage device 100 configuring the HA pair configuration.

In Step 900, the QoS policy Gr management table 303 is referred to.

In Step 901, the storage controller 106 checks the HA state of the HA pair. Thereafter, the flow proceeds to Step 902.

In Step 902, it is checked whether or not the failover 205 has been performed for the own device. In the case where the own device is on the primary side, the flow proceeds to Step 903, and in the case where the own device is on the secondary side, the flow proceeds to Step 907.

In Step 903, it is checked whether or not the storage controller 106 is in the degeneration state. If a failure or the like occurs and the storage controller is in the degeneration state, the flow proceeds to Step 904, and if the state is normal, the flow proceeds to Step 906.

In Step 904, the QoS policy Gr management table 303 is referred to, and the application policy 702 in which the application condition 701 is "HA primary" and the detailed condition 703 is "CTL degeneration" is selected. Thereafter, the flow proceeds to Step 905.

In addition, in Step 906, the QoS policy Gr management table 303 is referred to, and the application policy 702 in which the application condition 701 is "HA primary" and the detailed condition 703 is "CTL normal" is selected. Thereafter, the flow proceeds to Step 905.

On the other hand, if the own device is on the secondary side in Step 902, it is checked in Step 907 whether or not the storage controller 106 is in the degeneration state. If a failure or the like occurs and the storage controller is in the degeneration state, the flow proceeds to Step 908, and if the state is normal, the flow proceeds to Step 909.

In Step 908, the QoS policy Gr management table 303 is referred to, and the application policy 702 in which the application condition 701 is "HA secondary" and the detailed condition 703 is "CTL degeneration" is selected. Thereafter, the flow proceeds to Step 905.

In addition, in Step 909, the QoS policy Gr management table 303 is referred to, and the application policy 702 in which the application condition 701 is "HA secondary" and the detailed condition 703 is "CTL normal" is selected. Thereafter, the flow proceeds to Step 905.

In Step 905, the QoS for each LDEV is set according to the policy number 600 of the application policy 702.

<QoS Policy Risk Detection Flow>

Figure 10:
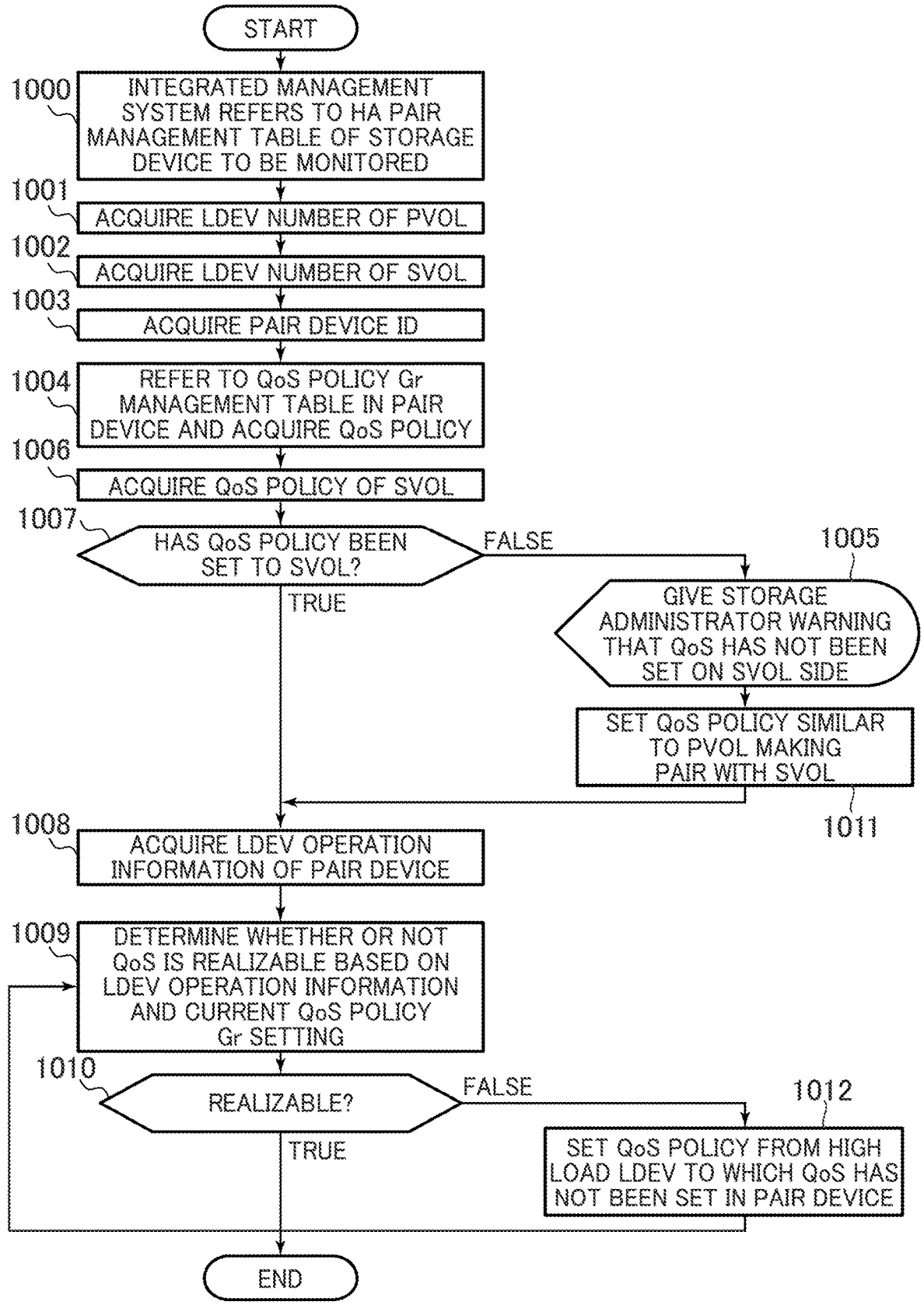
FIG. 10 shows a processing example of a QoS policy risk detection flow in the storage device of the embodiment of the present application.

FIG. 10 shows a processing example of a QoS policy risk detection flow in the storage device of the embodiment of the present application.

This processing flow is generally executed by the integrated management system 121, and the integrated management system 121 checks, for the HA pair configured in the storage device 100 to be monitored, whether or not the QoS setting set in the PVOL of the primary-side device has been set as the QoS policy to be applied after the failover in the SVOL of the secondary-side device. As a result of the check, in the case where the setting has not been set, the integrated management system 121 gives a warning to the storage administrator and sets the QoS setting set in the PVOL as the QoS policy to be applied after the failover of the SVOL. In addition, the integrated management system 121 checks whether or not the processing capability of the storage device on the secondary side is sufficient with respect to the QoS setting value in the QoS policy to be applied on the secondary side after the failover, and gives a warning or controls the QoS setting value if it is insufficient. For example, in the case where processing based on the QoS policy after the failover exceeds an IO bandwidth or IOPS available in the storage device 100 on the secondary side by referring to the operation rate in the past of the LDEV to which the QoS has not been set, the QoS is set to a high-load LDEV to which the QoS has not been set, so that the QoS setting value after the failover to the SVOL can be realized.

In Step 1000, the integrated management system 121 refers to the HA pair management table 300 in the storage device 100 to be monitored.

In Step 1001, the LDEV number 400 of the PVOL in the HA pair is acquired.

In Step 1002, the LDEV number 400 of the SVOL in the HA pair is acquired.

In Step 1003, the pair device ID 503 in the HA pair is acquired.

In Step 1004, the QoS policy after the occurrence of failover is acquired by referring to the QoS policy Gr management table 303 of the pair device. Specifically, the application policy 702 of the entry in which the application condition 701 is "HA primary" is acquired.

In Step 1006, the QoS policy in the SVOL is acquired from the QoS policy management table 302.

In Step 1007, it is checked whether or not the QoS policy has been set in the SVOL. If the QoS policy has not been set, the flow proceeds to Step 1005, and if the QoS policy has been set, the flow proceeds to Step 1008.

In Step 1008, the LDEV operation information table 304 of the pair device is referred to, and operation information in the device is acquired.

In Step 1009, it is determined on the basis of the operation information in the pair device and the currently-set QoS policy Gr setting whether or not the setting items (for example, the maximum/minimum IOPS or the IO bandwidth) set in the QoS policy for each LDEV exceed the device capability in view of the operation information of the device, and it is determined whether or not the items set in the QoS policy can be realized.

In Step 1010, in the case where it is determined that the items set in the QoS policy cannot be realized and the risk is high, the flow proceeds to Step 1012, and in the case where it is determined that the items can be realized, the flow is terminated.

In Step 1012, among the LDEVs to which the QoS has not been set in the pair device, the QoS policy is set to a high-load LDEV having a high operation rate from the LDEV operation information. In this case, as a QoS policy determination method, a value in a range in which the QoS policy set by the QoS policy Gr does not exceed the device capability may be obtained on the basis of, for example, an average value in the operation information of the LDEV or an average value of the entire LDEVs in which the QoS has not been set.

In Step 1005, a warning that the QoS has not been set in the SVOL is given to the storage administrator, and a warning that the SLA is not guaranteed in the SVOL after the failover is given to the pair device.

In Step 1011, the QoS policy set to the PVOL is similarly applied to the SVOL, and in Step 1008 to Step 1010, it is checked whether or not the policy can be realized.

As described above, the storage system according to the embodiment has the storage device 100 for providing a volume to a host connected via a network, and includes a storing unit for storing a plurality of policy sets that is a regulation group relating to the service quality of the volume and a policy selection unit for selecting a policy set used from the plurality of policy sets in accordance with the state of the storage device.

With such a configuration and operation, appropriate operation in accordance with the state of the storage device can be realized.

Here, the policy set corresponds to a QoS policy group.

In addition, the storing unit may be the DRAM 115 of the storage device 100 or a storage area provided in the integrated management system 121.

In addition, the policy selection unit may be the integrated management system 121 or the CPU 114 of the storage device 100.

In addition, the storage system has a redundant configuration for executing failover from the PVOL 201 of the storage device 100A to the SVOL 200 of the second storage device 100B in the case where a failure occurs in the first storage device 100A, the storing unit stores a policy set used by the second storage device 100B before the execution of the failover and a policy set used after the execution of the failover, and the policy set used after the execution of the failover is high in performance assigned to the second volume and low in performance assigned to the plurality of other volumes as compared to the policy set used before the execution of the failover.

With such a configuration and operation, in the case where an HA pair is configured between the first storage device and the second storage device and an SLA guarantee using the QoS is performed in the PVOL, even when failover is performed for the SVOL, the SLA guarantee using the QoS equivalent to the PVOL can be realized in the SVOL.

In addition, the policy set used by the second storage device before the execution of the failover is a regulation group for giving priority to processing performed independently of data processing relating to the host, and the policy set used by the second storage device after the execution of the failover is a regulation group for giving priority to the data processing relating to the host.

With such a configuration and operation, for example, the QoS can be set so that IO from a host or application used for a secondary purpose is given priority in the second storage device until the failover occurs, and after the failover, the QoS can be set so that IO to the SVOL is given priority.

In addition, the policy selection unit compares the processing capability of the second storage device with the policy set used by the second storage device after the execution of the failover, and gives a warning in the case where the processing capability of the second storage device is insufficient.

With such a configuration and operation, in the case where there is a risk in the SLA at the time of failover, the storage administrator can know in advance, so that the occurrence of a failure caused by the SLA at the time of failover can be prevented.

In addition, a degeneration operation of a controller can be performed in the storage device, and the storing unit stores a policy set used in the case where the degeneration operation is unnecessary and a policy set used during the degeneration operation.

With such a configuration and operation, even in the case where the state of the storage device changes due to the occurrence of degeneration, an appropriate QoS setting can be used in accordance with the change.

In addition, if the storing unit is configured to store a plurality of policy sets that differs depending on time, and the policy selection unit is configured to select a policy set corresponding to the point in time, an appropriate QoS setting according to a change in the processing amount due to time and the day of the week can be used.

Although one embodiment has been described above, the embodiment is an example for describing the present invention, and the scope of the present invention is not limited to only this embodiment. The present invention can be carried out in other forms.

What is declared is:

1. A storage system having a first storage device for providing a first volume to a host connected via a network and a second storage device for providing a plurality of volumes including a second volume as a remote copy destination of the first volume, the storage system comprising:
    a storing unit for storing a plurality of policy sets that is a regulation group relating to a service quality of the second volume and a plurality of other volumes of the second storage device; and
    a policy selection unit for selecting a policy set to be used from the plurality of policy sets in accordance with states of the first volume and the second storage device.

2. The storage system according to claim 1, wherein a redundant configuration for executing failover from the first volume to the second volume in a case where a failure occurs in the first storage device is provided,
    wherein the storing unit stores a policy set used by the second storage device before the execution of the failover and a policy set used after the execution of the failover, and
    wherein the policy set used after the execution of the failover is high in performance assigned to the second volume and low in performance assigned to the plurality of other volumes as compared to the policy set used before the execution of the failover.

3. The storage system according to claim 2, wherein the policy set used by the second storage device before the execution of the failover is a regulation group for giving priority to processing performed independently of data processing relating to the host, and the policy set used by the second storage device after the execution of the failover is a regulation group for giving priority to the data processing relating to the host.

4. The storage system according to claim 2, wherein the policy selection unit compares a processing capability of the second storage device with the policy set used by the second storage device after the execution of the failover, and gives a warning in a case where the processing capability of the second storage device is insufficient.

5. The storage system according to claim 1, wherein a degeneration operation of a controller is configured to be performed in the first storage device and/or the second storage device, and
wherein the storing unit stores a policy set used in a case where the degeneration operation is unnecessary and a policy set used during the degeneration operation.

6. The storage system according to claim 1, wherein the storing unit stores a plurality of policy sets that differs depending on time, and
wherein the policy selection unit selects a policy set corresponding to a point in time.

7. A storage device for providing a volume to a host connected via a network, the storage device comprising:
a storing unit for storing a plurality of policy sets that is a regulation group relating to a service quality of the volume; and
a policy selection unit for selecting a policy set to be used from the plurality of policy sets in accordance with a state of an own device.

8. A storage device management method for managing a first storage device for providing a first volume to a host connected via a network and a second storage device for providing a plurality of volumes including a second volume as a remote copy destination of the first volume, the method comprising:
storing into a storing unit a plurality of policy sets that is a regulation group relating to a service quality of the second volume and a plurality of other volumes of the second storage device;
determining states of the first volume and the second storage device; and
selecting a policy set to be used from the plurality of policy sets in accordance with the states of the first volume and the second storage device.

* * * * *